Dec. 3, 1968   A. HURWITZ   3,414,073
CONTROL DEVICE FOR VEHICLE POWER STEERING MECHANISM
Filed Feb. 23, 1967
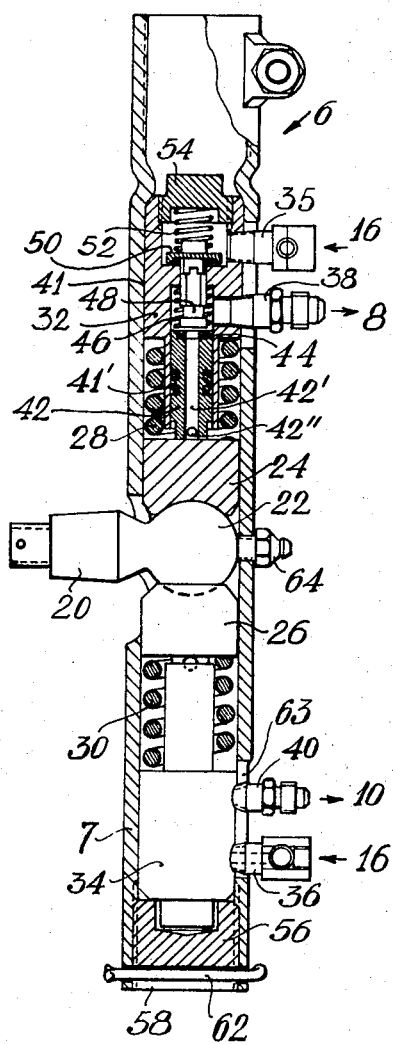
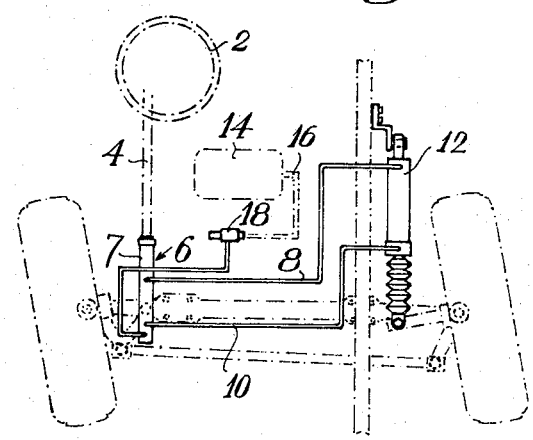
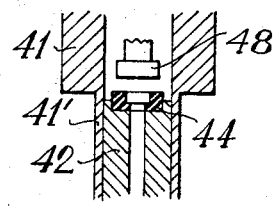
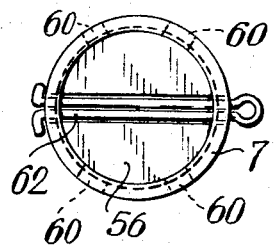
INVENTOR
ALEXANDER HURWITZ
BY *Benjamin J. David*
ATTORNEY

United States Patent Office 3,414,073
Patented Dec. 3, 1968

3,414,073
CONTROL DEVICE FOR VEHICLE POWER STEERING MECHANISM
Alexander Hurwitz, 33 Yawnieli St., Givatayim, Israel
Filed Feb. 23, 1967, Ser. No. 617,874
5 Claims. (Cl. 180—79.2)

ABSTRACT OF THE DISCLOSURE

A control device for a vehicle power steering mechanism comprises a tubular housing forming a portion of the vehicle steering rod, a ball displaceable within the housing in accordance with the direction of steering, and valves on opposite sides of the ball controlling the power fluid in accordance with the direction of displacement of the ball. The device includes a spring on each side of the ball and a plug movable within an end of the housing for compressing the springs and thereby varying the manual force required to actuate the power steering mechanism. The plug is formed with a diametrical slot receiving a pin, and the housing end is formed with a plurality of pairs of diametrically opposed openings receiving the pin ends.

BACKGROUND OF THE INVENTION

*Field of the invention.*—The present invention relates to a control device for vehicle power steering mechanisms, and particularly to a control device operated by the vehicle steering system for controlling the power fluid to the power steering mechanism.

*Description of the prior art.*—A number of vehicle power steering mechanisms and control devices have been devised. My British patent specification No. 821,066 describes one type in which the control device is incorporated mainly within the vehicle steering rod and is movable by the vehicle steering system. A portion of the steering rod includes a lever terminating in a ball disposed within the housing. The ball is displaceable within the housing, against the action of a coil spring on each side thereof, in accordance with the direction of movement of the housing, i.e. of the steering rod. Valves are disposed on opposite sides of the ball to control the power fluid applied to opposite sides of the power steering mechanism in accordance with the direction of displacement of the ball.

It is frequently desired to adjust the "hardness" of the power steering mechanism, i.e., the amount of force required by the driver to turn the steering wheel. For example, trucks for different driving conditions require different "hardness" in steering. Also, after a period of time the hardness of the steering changes because of wear and tear of the vehicle parts. In both cases, as well as in other instances, it is advantageous to permit the hardness of the steering to be conveniently adjusted.

SUMMARY OF THE INVENTION

The present invention provides a control device which enables the hardness of the power steering mechanism to be adjusted in a very convenient manner. Briefly, the invention provides a plug carried at one end of the housing and adjustable within the housing to compress the coil springs and thereby the force required to actuate the power steering mechanism. The plug is formed with a diametrical slot at ts outer face which receives a pin. The end of the housing carrying the plug is formed with a plurality of pairs of diametrically opposed openings around the circumference of the housing receiving the ends of the pin and thereby locking same and the plug in position within the housing. By making the diametrical slot of greater height than the thickness of the pin, a wide range of adjustments is provided.

BRIEF DESCRIPTION OF THE DRAWINGS

FIG. 1 is a diagramatic view illustrating a vehicle power steering mechanism incorporating a control device constructed in accordance with the present invention;

FIG. 2 is a longitudinal sectional view, partly broken away, of a referred embodiment of control device constructed in accordance with the invention;

FIG. 3 is an enlarged detail of FIG. 2; and

FIG. 4 is an end view of the control device of FIG. 2.

DESCRIPTION OF THE PREFERRED EMBODIMENT

FIG. 1 schematically illustrates the complete vehicle steering system, including the steering wheel 2, and the steering rod 4, the lower portion of which constitutes a control device 6 within a tubular housing 7 containing the control elements for controlling the flow of the power fluid through lines 8 and 10 to the power steering mechanism including cylinder 12. In this case, the power steering mechanism is pneumatically operated (e.g., for heavy trucks) and includes an air supply 14 connected by a line 16 to two inlets, one at each end of the control device 6. The air supply 14 may be the same as that operating the pneumatic brakes, and a safety valve 18 is provided in line 16 to shut off the air supply to the power steering mechanism should the pressure fall below a predetermined minimum for brake operation.

The control device 6, as illustrated in FIG. 2, includes a lever 20 terminating at one end in a ball 22 disposed within the tubular housing 7. The opposite end of lever 20 projects through an opening in the housing and is connected to a steered part of the vehicle, for example an extension of one of the wheel stubaxles. A pair of blocks 24 and 26, each having a curved face adapted to bear against one side of ball 22, are slidably disposed within the housing and are pressed against the ball by a coil spring 28, 30 bearing against its respective block at one end, and against a valve chest 32, 34 at its other end. Each valve chest contains valves for controlling the flow of the power fluid through lines 8 and 10 to the power steering cylinder 12. The power fluid, in this case air, is applied to the device through a pair of inlets 35 and 36, and is directed either through outlet 38 and line 8 to one side of the fluid cylinder 12, or through outlet 40 and line 10 to the other side of the fluid cylinder, depending upon the direction of displacement of ball 22 with respect to housing 7, as will be described more fully below.

The two valve chests 32 and 34 are of the same construction, and therefore only one is illustrated in detail. With respect to valve chest 32, this includes an upper body portion 41 and a lower cylindrical portion 41' of reduced diameter. A valve stem 42, formed with a longitudinal bore 42' and a radial bore 42" at its lower end, bears against block 24 and passes through cylindrical portion 41'. Its upper end carries an apertured valve seat 44 disposed just below the outlet 38. Stem 42 and valve seat 44 are urged downwardly against block 24 by a coil spring 46.

Another valve stem 48 passes through body member 41 of valve chest 32 and terminates in a valve member 50 just below the inlet 35, this valve member being urged to its closed position against its seat in the valve chest by a coil spring 52 interposed between it and end plug 54. In the normal position of valve stem 42, stem 48 is spaced above the top surface of valve seat 44, the latter being adapted to be moved into engagement with stem 48 and to lift it, as will be described below. Valve stem 48 is longitudinally grooved to permit the flow of the air when valve seat 50 is moved to its open position.

The valve arrangement within valve chest 34 is similarly constructed. At that end of the housing there is provided a further end plug, shown at 56, which is used for changing the "hardness" of the steering wheel. End plug 56 is threaded into the lower end of the housing 7 and is formed with a diametrical slot 58 at its outer face. That end of the housing is also formed with a plurality of diametrically opposed openings 60 (FIG. 3). Slot 58 receives a pin 62 the end of which passes through one pair of openings 60.

Housing 7 is formed with slot 63 through which the inlet end and outlet fixtures 36 and 40 pass, slot 63 being elongated as to accommodate these fixtures under all conditions of adjustment of nut 56.

A grease cup 64 is provided in housing 7, if desired, to permit lubrication of ball 22.

The operation of the device will be apparent from the foregoing description. In the normal position of the parts, i.e., with the upper surface of valve seat 44 spaced below the lower surface of valve stem 48, outlet 38 is vented to the atmosphere through the space between valve stem 48 and valve seat 44, this vent path also including axial bore 42' and radial bore 42". Inlet 35 is closed by valve member 50 bearing against its seat by spring 52.

Upon manual turning of the steering wheel, the housing 7 will be moved upwardly or downwardly in accordance with the direction of movement of the wheel. Assuming that housing 7 is moved downwardly, this will cause ball 22 and block 24 to be moved upwardly, forcing the valve stem 42 to be moved upwardly until seat 44 engages the lower surface of valve stem 48. The latter will thereupon also be moved upwardly. The engagement of seat 44 with valve stem 48 closes the vent to outlet 38, and the lifting of steam 48 unseats its valve member 50 and connects the outlet 30 to inlet 35. The pressure fluid (air in this case) will thus be applied through line 8 FIG. 1 to the upper end of the power cylinder 12.

If, on the other hand, the housing 7 is moved downwardly, the corresponding valves within the lower valve chest 34 will be similarly controlled so as to connect inlet 36 to outlet 40, whereby the pressure fluid will be applied through line 10 to the other side of the power cylinder 12.

It will be seen that the displacement of ball 22 is opposed by coil springs 28 and 30. To change the amount of force required to actuate the power steering mechanism, plug 56 is threaded more or less into the lower end of housing 7 and is locked in position by passing pin 62, received within slot 58, through a pair of diametrically opposed openings 60. Thus, by adjusting the one plug 56, the "hardness" on both sides of the ball 22, i.e., the force required to move the steering wheel in either direction, are adjusted simultaneously.

In one embodiment, for example, springs 28 and 30 were of a design requiring a force of 10 kg. per millimeter of displacement. The space between the upper surface of valve member 44 and the lower surface of valve stem 48 was 4 mm. Assuming that valve stem 48 had to be moved 1 mm. in order to actuate the inlet valve, it is seen that the total displacement of ball 22 in order to actuate the power steering mechanism was 5 mm., requiring a force of 50 kg. By adjusting plug 46 so as to decrease the space between member 44 and stem 48 from 4 mm. to 2 mm., the displacement of ball 22 to actuate the mechanism was 3 mm., reducing the force required from 50 kg. to 30 kg. The "feel" on the steering wheel itself was thus proportionately reduced.

By making slot 58 of substantially greater height than the thickness of pin 62, a very wide range of adjustments may be effected.

I claim:

1. A control device for a vehicle power steering mechanism, comprising, a tubular housing, a lever carrying at one end a ball disposed within said tubular housing, said tubular housing and the opposite end of said lever being connectable to different parts of the vehicle so that said ball is displaceable within said housing in accordance with the direction of steering of the vehicle, first and second valve means within said housing each disposed on an opposite side of said ball and controlling the power fluid applied to opposite sides of said power steering mechanism in accordance with the direction of displacement of said ball, a coil spring on each side of said ball, a plug carried at one end of said housing and formed with a diametrical slot at its outer face, and a pin received in said diametrical slot, said one end of the housing being formed with a plurality of pairs of diametrically opposed openings around the circumference thereof, each pair of openings adapted to receive the ends of said pin and locking the plug in any one of a plurality of positions within the housing for compressing said springs and thereby adjusting the force required to actuate said power steering mechanism.

2. A control device as defined in claim 1, wherein said diametrical slot is of greater height than the thickness of said pin.

3. A control device as defined in claim 1, wherein said plug is threadedly received within said one end of the housing.

4. A control device as defined in claim 1, wherein said tubular housing forms a portion of the vehicle steering rod, and wherein said lever is connected to a steered part of the steering system.

5. A control device as defined in claim 1, wherein said tubular housing is formed with an elongated slot at said one end thereof, there being inlet and outlet fixtures connected to said valve means and disposed within said elongated slot.

References Cited

UNITED STATES PATENTS

| | | | |
|---|---|---|---|
| 2,754,924 | 7/1956 | Hammond | 180—79.2 |
| 2,893,505 | 7/1959 | Schultz | 180—79.2 |
| 3,101,801 | 8/1963 | Gordon | 180—79.2 |

BENJAMIN HERSH, *Primary Examiner.*

L. D. MORRIS, Jr., *Assistant Examiner.*